April 8, 1947.  V. HARASTY  2,418,637
STARTING AND MANUAL PROPELLING SYSTEM FOR LIFE BOATS
Filed Dec. 7, 1944
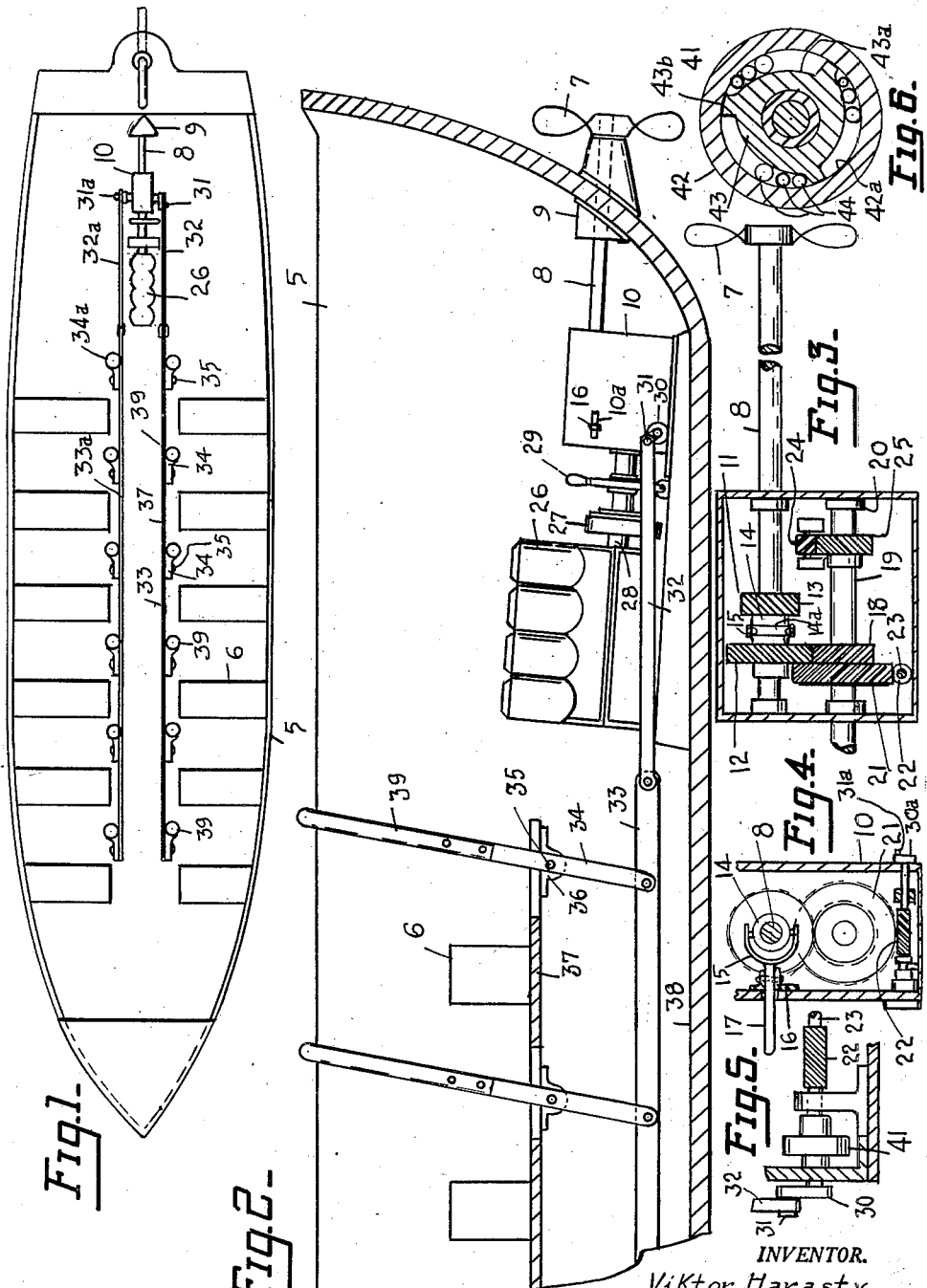
INVENTOR.
Viktor Harasty
BY Carl Miller
ATTORNEY Patented Apr. 8, 1947

2,418,637

UNITED STATES PATENT OFFICE 2,418,637

STARTING AND MANUAL PROPELLING SYSTEM FOR LIFEBOATS

Viktor Harasty, Whitestone, N. Y.

Application December 7, 1944, Serial No. 567,024

1 Claim. (Cl. 115—24)

This invention relates to means for enabling the crew and passengers of a life boat to start its engine, by operating manual levers and mechanism actuated thereby for starting the engine.

Another object of the invention is to provide a life boat with means for starting the engine, which can also be varied to directly operate the screw propeller in the event that there is no fuel to operate the engine, or in case of service or operational difficulties which cannot be corrected.

With the above and other objects in view the invention consists in certain new and useful constructions, combinations, and arrangements of parts, clearly described in the following specification, and fully illustrated in the accompanying drawings, in which:

Fig. 1 is a plan view of a life boat.

Fig. 2 is a central vertical sectional view thereof, on an enlarged scale, and partly broken away for convenience.

Fig. 3 is a detail vertical sectional view through the gear transmission, showing the means for shifting the gears and the drive between the manually operated gear and the engine and propeller shafts.

Fig. 4 is a transverse sectional view thereof.

Fig. 5 is a detail side elevation of an overrunning clutch and drive gear.

Fig. 6 is a vertical sectional view through the overrunning clutch.

Referring to the accompanying drawings, which illustrate the practical embodiment of my invention, 5 designates a life boat, which may be of any type of construction, and which in this example is shown to be provided with a series of seats 6, suitably spaced apart from each other.

This life boat is provided with a screw propeller 7, which is operated by a shaft 8, which works in a bearing 9, and extends rearwardly from this bearing into the housing 10 of the gear transmission set 11. The propeller shaft carries a large gear wheel 12 and a small gear wheel 13, connected to each other by the sleeve 14, which is formed with a groove 14a, engaged by the jaws of the spanner yoke 15, which is pivoted on the bearing 16 of the housing 10, and the handle 17 of the yoke 15 extends outwardly of the housing 10, through the slot 10a thereof. This yoke lever is thus mounted to swing horizontally to shift the sleeve 14 and the two gear wheels 12 and 13 connected thereto, on the propeller shaft, and these wheels are splined to the propeller shaft so as to rotate therewith.

The large gear wheel 12 is arranged to engage the smaller gear wheel 18, which is keyed to the shaft 19, mounted to turn in bearings 20 of the housing 10. This shaft carries a larger gear wheel 21, which is engaged by the small pinion gear 22, on the manual starting shaft 23. This pinion gear 22 may be a gear worm and the engaged gear wheel 21 may be a worm wheel. There is a gear reduction between the gear 12 and the gear 18, and between the gear wheel 21 and the drive pinion gear 22.

The smaller gear wheel 13 of the propeller shaft is adapted to engage the reverse pinion gear 24, which engages the larger gear 25 on the shaft 19, and the two gears 12 and 13 may be shifted to a position intermediate of the gear wheel 18 and the reverse pinion gear 24, so as to place the whole transmission in neutral, and to cut-out the propeller shaft from driving connection with the shaft 19, when it is desired to start the engine, indicated at 26.

The shaft of the engine is coupled to one of the members of the clutch 27, through the bearing 28, and the cooperating clutch member is coupled to the shaft 19. The clutch is operated by means of the lever 29, so that the engine may be cut-out from driving engagement with the shaft 19, or connected for driving engagement thereto.

The manual starting shaft 23 is equipped on one end with a disc 30, which is provided with an eccentric drive pin 31, and this is engaged by the pitman or link 32. The other end of the drive shaft 23 is similarly equipped with a disc 30a, which is provided with an eccentric pin 31a, engaged by the pitman or link 32a. The pitman or link 32 is pivotally connected to a main operating beam or rod 33, which is pivotally connected to the lower ends of the upright levers 34. Each of these levers is pivotally supported by its pin 35 in a bearing 36, mounted on the floor or planking 37, which forms a structural part of the life boat, the beam or rod 33 being supported well below the floor or planking, but above the bottom 38 of the boat.

Each of the levers is equipped with an upright handle 39, which is rounded for convenience of operation.

The pitman or link 32a is engaged by the beam or rod 33a, and this beam is pivotally connected to the lower ends of the levers 34a, and supported thereby. The levers 34a are pivotally supported by bearings similar to the bearings 36. The eccentric pin 31a of the disc 30a is disposed in advance of the eccentric pin 31 of the disc 30, so that one of said pins will always be out of dead center position when the other pin is in dead center position.

The manual starting shaft 23 is equipped with an overrunning clutch 41, which includes the outer cylinder 42, having a cylindrical inner bearing face 42a, and the multiple cam member 43, which works within the cylinder. The cam member 43 is shown to be equipped with three cam faces or inclines 43a and provided with a stop 43b at the end of each cam face or incline. Each cam face or incline is engaged by a plurality of rollers 44 of three different sizes. The cam member is coupled directly to the eccentric driving disc and the cylinder is coupled to the gear pinion.

When the engine starts as a result of the turning effort developed by the manual operation of the levers and the horizontal beams or rods, which cause a rotative movement of the starting shaft 23 and its gear pinion 22 and shaft 19 connected to the engine shaft, the cylinder 42 will start under its own power from the engine and develop a speed of rotation faster than that of the starting eccentric pin and the levers will be automatically disengaged from the gear pinion.

When the friction clutch 27 is in disengaged position, and the hand levers are operated, the shaft 19 will be rotated. When the gear 12 is engaged, as in Fig. 3, the propeller shaft will be rotated by the turning of the drive shaft 23, through the levers, beams and pitmans. By disengaging the drive gear 12 from the gear 18 of the shaft 19, and engaging the friction clutch 27, the engine may be started by operating the levers. By placing the transmission gears in reverse driving position and by disengaging the friction clutch, the propeller may be operated in reverse driving direction.

My invention provides a life boat with means which will enable a life boat crew or its passengers to manually start a heavy internal combustion engine, whether it be a spark ignited or a Diesel type of engine, and in the event that the engine has been rendered unfit for operation, or the fuel supply has been lost or is exhausted, to operate the screw propeller in either of its two directions of rotation, so as to manually propel the life boat through the sea waters.

The effect of such additional equipment upon the morale and confidence of the passengers and crew of the life boat would be enormous, as it would immediately establish complete confidence in their ability to navigate the life boat to a position of safety.

It is understood that various changes in the details of construction, the arrangement and combination of parts, may be resorted to, within the scope of the claim of this invention.

Having described my invention I claim as new:

A life boat comprising a hull having a propeller shaft mounted for rotation thereon, a screw propeller fastened to the end of said shaft, an internal combustion engine in said hull, driving mechanism including shiftable transmission gears on said propeller shaft and a second shaft having gears for selective meshing with said shiftable transmission gears connecting the engine and propeller shaft, a clutch for controlling engagement of said second shaft with said engine, a starting pinion having driving engagement with said second shaft, an overrunning clutch having driving connection with said pinion, an eccentric pin having driving connection with the overrunning clutch, a pitman pivotally connected with said eccentric pin, a beam pivotally connected with said pitman, and a series of manually operable levers pivotally mounted within the hull and having pivotal engagement with said beam, whereby the engine may be started or the propeller shaft may be manually rotated to propel the life boat.

VIKTOR HARASTY.

REFERENCES CITED

The following references are of record in the file of this patent:

UNITED STATES PATENTS

| Number | Name | Date |
| --- | --- | --- |
| 1,860,173 | Colstad | May 24, 1932 |
| 303,797 | Bernhard | Aug. 19, 1884 |

FOREIGN PATENTS

| Number | Country | Date |
| --- | --- | --- |
| 489,624 | British | July 29, 1938 |